United States Patent [19]

Mullen

[11] 4,203,382
[45] May 20, 1980

[54] TIRE REMOVAL INDICATOR DEVICE

[76] Inventor: James P. Mullen, P.O. Box 815, Roswell, Ga. 30075

[21] Appl. No.: 969,341

[22] Filed: Dec. 14, 1978

[51] Int. Cl.² .................... B60R 13/00; B60R 25/00
[52] U.S. Cl. .................... 116/28 R; 70/229; 280/762; 301/37 AT; 116/33
[58] Field of Search ............ 116/28 R, 33; 301/37 AT, 37 AF, 108 SC, 108 S, 37 SC; 70/231, 229, DIG. 57; 292/327; 73/146

[56] References Cited

U.S. PATENT DOCUMENTS

| | | | |
|---|---|---|---|
| 2,033,371 | 3/1936 | Benaggio | 292/327 X |
| 2,103,743 | 12/1937 | Doty | 292/327 |
| 2,151,485 | 3/1939 | Pawsat | 301/108 SC |
| 2,228,738 | 1/1941 | Thomson | 292/327 |
| 2,695,195 | 11/1954 | O'Day | 301/37 AT X |
| 3,768,849 | 10/1973 | Sytko | 292/327 |
| 4,010,788 | 3/1977 | Van Gampel | 292/327 X |

FOREIGN PATENT DOCUMENTS

0303545 12/1932 Italy .................................. 70/229

*Primary Examiner*—Daniel M. Yasich
*Attorney, Agent, or Firm*—B. J. Powell

[57] ABSTRACT

A method of and apparatus for indicating the removal of lug nuts from the lug bolts on a vehicular hub mounted rim and tire assembly to provide an indication of whether the rim and tire assembly has been removed which includes operatively associating an indicator member with the lug bolt/lug nut connections holding the rim and tire assembly onto the vehicular hub after the lug nut has been tightened onto the lug bolt to mount the rim and tire assembly so that the indicator member is destroyed beyond reuse if the lug nut with which the indicator member is associated is removed, yet the indicator member does not prevent the lug nut from being removed.

8 Claims, 19 Drawing Figures

TIRE REMOVAL INDICATOR DEVICE

BACKGROUND OF THE INVENTION

Container shipment of goods has acquired widespread use because of reduced shipping costs and efficiency of movement. The containers can be easily transferred between different modes of transportation such as ship, rail and truck without the goods in the containers having to be transferred. For transportation of the containers overland, the loaded container is generally placed on a wheeled trailer frame commonly known as the chassis. A conventional over-the-road tractor may be hooked to the chassis to make up an articulated tractor-trailer truck for overland movement. The containers mounted on the chassis are also frequently moved by railroad flat car for overland movement.

It has become common practice for shipping companies to own fleets of these containers as well as the chassis for supporting the containers. Ocean shipping companies, however, do not usually perform overland transportation. As a result, they must provide their equipment, the containers and chassis, to inland carriers to accomplish the overland portion of the container and chassis movement. Often several inland carriers are involved in the overland portion of the movement. By way of example, a hypothetical illustration of the inland movement of a container/chassis combination from ocean port A to inland city B follows.

(I) The container is offloaded from an ocean going vessel onto the chassis at the ocean terminal in port A and the container/chassis combination is moved to a railroad terminal in port A by truck.

(II) The container/chassis combination is loaded onto a railroad flat car at the railroad terminal in port A and then transported to a regional city C in the vicinity of inland city B rail.

(III) The container/chassis combination is offloaded from the railroad flat car at the railroad terminal in regional city C and delivered to the ultimate receiver of the goods in inland city B by truck.

(IV) The emptied container/chassis combination is returned from the receiver in inland city B to a container storage yard in regional city C by truck.

(V) The empty container/chassis combination is picked up at the container storage facility in regional city C and moved by truck to a shipper's facility in regional city C where the container is reloaded for export.

(VI) The loaded export container/chassis combination is returned from the shipper's facility to the railroad terminal in regional city C by truck.

(VII) The loaded export container/chassis combination is placed on a railroad flat car at the railroad terminal in regional city C and transferred by train back to the railroad terminal in port city A.

(VIII) The loaded export container/chassis combination is picked up at the railroad terminal in port city A and transported to the ocean terminal in port city A by truck where the container is then offloaded from the chassis onto an ocean going vessel for shipment.

The fact that a container/chassis combination is handled by several different inland carriers presents little problem for the security of the cargo because the doors on the cargo container can be locked or sealed with a numbered seal in the same manner that the doors on an over-the-road tractor-trailer truck can be locked or sealed. This system works well because there exists a written interchange agreement between all of the inland carriers as well as the ocean carriers. These interchange agreements identify the seal numbers or locks on the container doors, the condition of the container when the inland carrier receives the container, the condition of the chassis when the carrier receives the chassis, and the per diem rental charges associated with the container and/or chassis. These interchange agreements are able to place the responsibility of the equipment on the carrier who has possesion of the equipment and can be used to pinpoint the particular inland carrier with which liability for damage or lost equipment can be attributed. Thus, if carrier A accepts an equipment interchange from carrier B, carrier A signs a receipt stating the condition of the equipment as well as the identification of the seal on the container doors if one exists. Thus, if carrier A accepted a container with Seal No. 10 on the container door and subsequently interchanged the equipment with no seal or a different seal on the container door, carrier A would be responsible to account for the change of seals and would be exposed to liability for a claim if there was a shortage of cargo.

While these interchange agreements have worked well with the container cargo as well as the container and chassis overall, the situation is more difficult to police under these interchange agreements when it comes to subparts of the equipment, particularly the tires on the chassis. At most interchange points, time and manpower does not permit careful inspection of the individual parts of the container and the chassis. A quick inspection confirms overall condition of the equipment and major damage can be easily noted. Current practice under these interchange agreements is not effective at controlling tire substitution on the chassis. Frequently, a chassis will leave the ocean shipper's facility with new tires and be returned after the inland portion of the journey with inferior replacement tires. This changes of tires is usually not spotted at the interchange points and, when the interchange of tires is actually spotted, it is often difficult to determine which inland carrier is responsible for the substituted tires, especially if the chassis has been interchanged several times. This same problem has also been experienced by all shipping companies that interchange equipment or lose possession of over-the-road wheeled equipment. Thus, the problem of tire substitution on wheeled equipment is experienced by all such equipment owners such as trucking companies, truck fleet owners, truck leasing companies, and shipping companies who own their own trailers as well as many other companies.

Various attempts have been made to solve this problem by providing some means to allow the trailer owner to quickly identify the tires that it places on the trailer. One of the problems with this practice is that access must be provided for the tires on the trailer frame or trailer to be removed at any time the wheeled equipment is in use so that the equipment tires can be changed as necessary in the event of a flat tire. The previous attempts at solving this problem have been relatively unsuccessful since they have not provided a sufficient indication to the equipment owner that the tires have been substituted when the equipment is returned.

SUMMARY OF THE INVENTION

These and other problems and disadvantages associated with the prior art are overcome by the invention disclosed herein by providing a means for easy and readily perceivable indication to the equipment owner that the tires on the equipment have been removed. This then affords the equipment owner the opportunity to check further to verify that the tires presently on the equipment are in fact the tires which left the premises on the equipment. On the other hand, the invention still permits the equipment operator to gain easy access to the tires for removal in the event that it is necessary for the operator to have the tires changed while the equipment is in his possession.

The apparatus of the invention includes a frangible indicator assembly operatively associated with at least one of the lug bolts with its accompanying lug nut. The indicator assembly is installed after the lug nut has been tightened onto the lug bolt to mount the rim and tire assembly so that removal of the rim and tire assembly requires the fracture of the frangible indicator asembly in order to remove the lug nut to remove the rim and tire assembly. After the frangible assembly has been fractured, it cannot again be reassembled and reused after the rim and tire assembly has been remounted.

The frangible assembly may include a tubular frangible member sized to fit over one of the lug nuts holding the rim and tire assembly in position after the lug nut is installed with locking means for locking the tubular frangible member onto the lug nut so that the frangible member must be fractured before it can be removed from the lug nut to gain access to the lug nut to remove the rim and tire assembly. The locking means includes a peripheral groove around the lug nut which lies in a plane generally normal to the central axis of the lug nut together with a plurality of locking members carried on the tubular frangible member. The locking members slide over the lug nut until the locking members engage the peripheral locking groove around the lug nut without fracturing the frangible tubular member but removal of the locking members from the peripheral locking groove is prevented without fracturing the tubular frangible member to an extent which precludes its reuse.

The invention also includes enclosing the indicator assembly with a code identifiable by the equipment owner. The shipping company is able to identify the code with an appropriate scanning device to identify whether the indicator assembly is genuine or counterfeit.

The indicator assembly may also engage the lug bolt rather than the lug nut to hold it in position. This indicator assembly would, however, be in interference with the lug nut as it is removed so that the indicator assembly would be destroyed if the lug nut is removed to remove the rim and tire assembly.

These and other features and advantages of the invention disclosed herein will become more apparent upon consideration of the following detailed description and accompanying drawings wherein like characters of reference designate corresponding parts throughout the several views and in which:

These figures and the following detailed descriptions disclosed specific embodiments of the invention; however, it is to be understood that the inventive concept is not limited thereto since it may be embodied in other forms.

DETAILED DESCRIPTION OF ILLUSTRATIVE EMBODIMENTS

Figures 1, 2, 3:
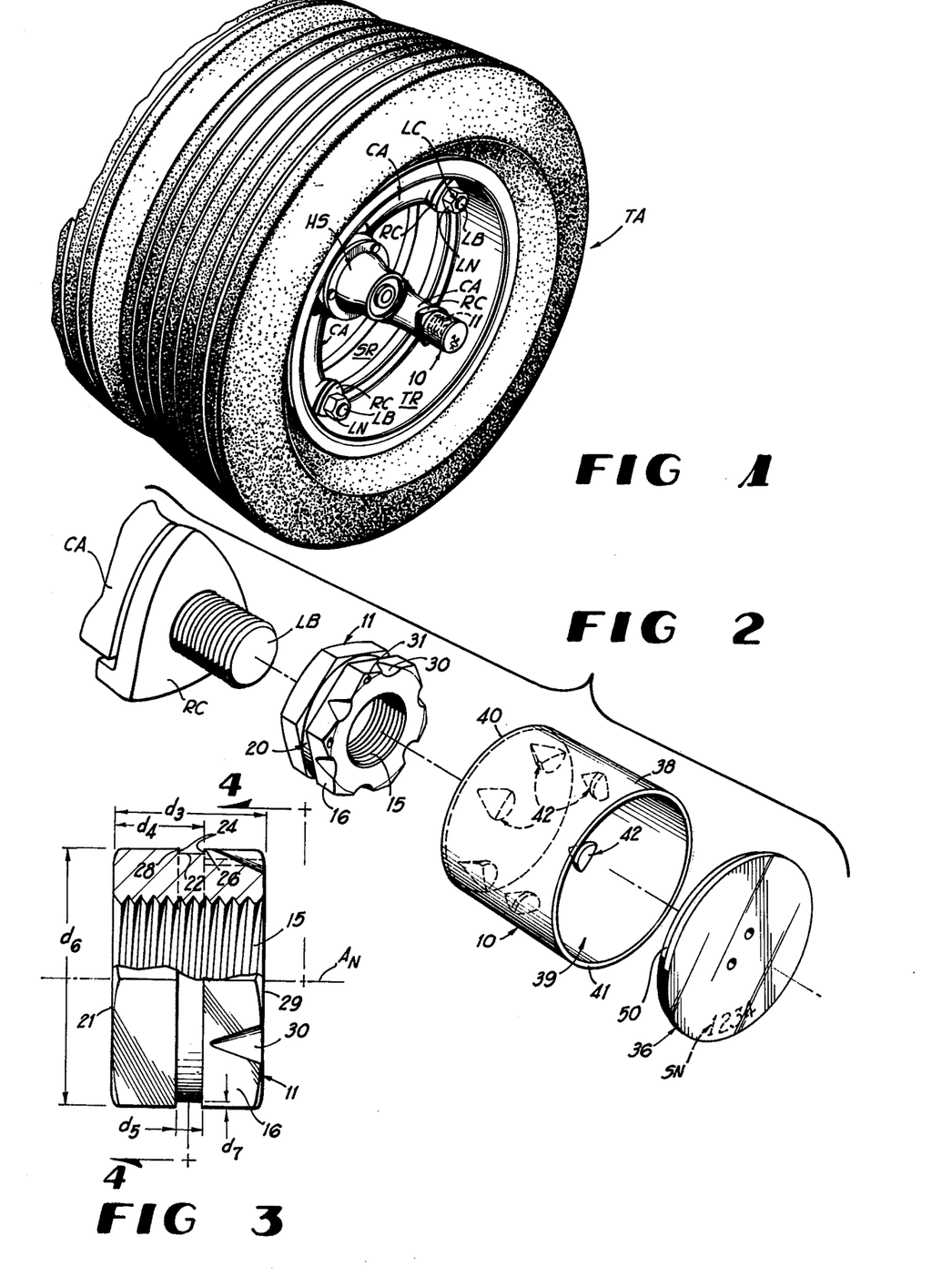
FIG. 1 is a perspective view illustrating the invention installed on a mounted rim and tire assembly.
FIG. 2 is an enlarged exploded perspective view of the invention of FIG. 1.
FIG. 3 is a side elevational view of the lug nut of the invention shown partly in cross-section to illustrate the internal construction thereof.

Referring to FIG. 1 of the drawings, it will be seen that the indicator assembly 10 of the invention is designed to be used with any wheel and tire assembly mounted on the lug bolts of vehicle hubs by lug nuts, but is especially designed for use with rim and tire assemblies TA found on trucks and trailers. These rim and tire assemblies TA are usually mounted in pairs on dual axle assemblies which have a hub spider HS with clamping arms CA. The clamping arms CA carry the lug bolts LB so that the tire rim TR of the rim and tire assemblies can be clamped onto the ends of the clamping arms CA with rim clamps RC that fit over the lug bolts LB and are held in place by the lug nuts LN. A spacer ring SR between the tire rims TR maintains the proper tire lateral spacing when the rim and tire assemblies TA are mounted in duals. In order to remove one of the rim and tire assemblies TA, it is necessary to remove the lug nuts LN. The indicator assembly 10 is designed to provide an indication that the rim and tire assembly TA has or has not been removed, yet still permit the rim and tire assembly to be removed if required. In order to provide such an indication that the rim and tire assembly has or has not been removed, the indicator assembly 10 is designed to be destroyed as an incident to the rim and tire assembly TA being removed. The indicator assembly 10 is associated with at least one of the lug bolt/lug nut connections LC holding the rim and tire assembly TA on the hub spider HS. The indicator assembly 10 may be associated with one of the conventional lug nuts LN or may be used with a special lug nut 11 as illustrated in the drawings in lieu of one of the conventional lug nuts. The indicator assembly 10 is best seen in FIGS. 2 and 5–9 while that lug nut 11 is best seen in FIGS. 2–4 and 7–9.

Figure 4:
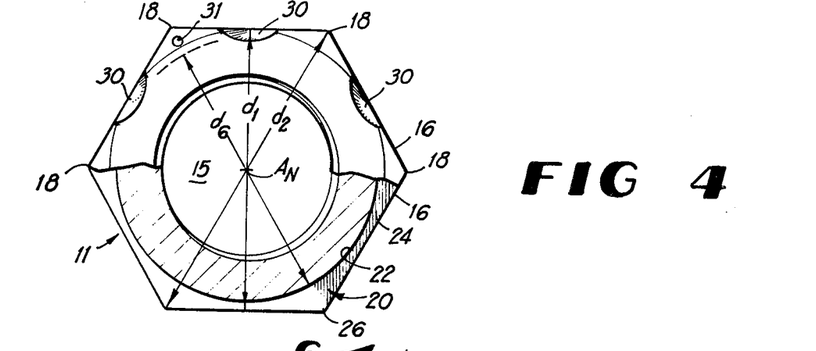
FIG. 4 is a view of the lug nut taken generally along the line 4—4 of FIG. 3.

The lug nut 11 corresponds generally to the conventional lug nuts LN in that it has an internally threaded hole 15 therethrough about the nut axis $A_N$ sized to threadedly engage the lug bolt LB to hold the rim clamp RC in place on the lug bolt. The lug nut 11 has the conventional wrenching flats 16 thereon with an opposed flat spacing $d_1$ (FIG. 4) corresponding to that of the conventional lug nuts LN. Adjacent wrenching flats 16 meet at corners 18 with a corner diameter $d_z$ (FIG. 4) greater than diameter $d_1$ as is conventional. The nut 11 is provided with a peripheral locking groove 20 which extends around the periphery of the nut in a plane generally normal to the nut axis $A_N$. The peripheral locking groove 20 may be located at any convenient position along the height $d_3$ (FIG. 3) of the nut 11 provided the dimensions of the indicator assembly 10 are appropriately sized as will become more apparent. The peripheral locking groove 20 is illustrated with its front edge located the distance $d_4$ forward of the back end surface 21 on nut 11. The locking groove 20 may have different configurations; however, locking groove 20 illustrated has a generally cylindrical bottom surface 22 with opposed side surfaces 24 lying in planes generally normal to the nut axis $A_N$. The locking groove 20 has width $d_5$ and the bottom surface 22 has a diameter $d_6$ which is less than the opposed flat spacing $d_1$ as seen in FIG. 3. Because of the bottom surface 22 is circular, the groove 22 has a minimum depth $d_7$ at the center of each of the wrenching flats 16 as seen in FIGS. 3 and 4. Thus, the peripheral locking groove 20 illustrated forms two shoulders, a front shoulder 26 and a rear shoulder 28 in the nut 11. As will become more apparent, it is front shoulder 26 that is used to lock the indicator assembly 10 onto the nut 11 as will become more apparent.

Figure 7:
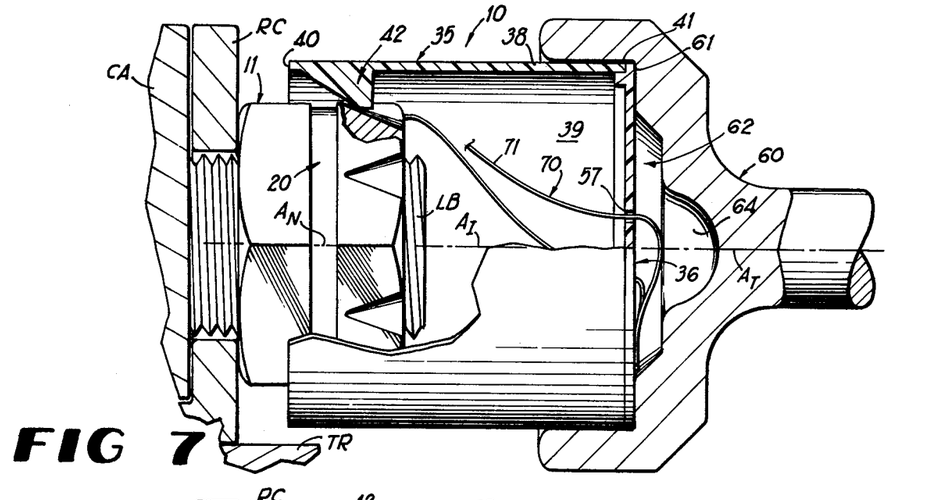
FIG. 7 is a side elevational view with portions thereof broken away to illustrate the invention ready to be installed.

To assist in attaching the indicator assembly 10 to the nut 11 as will become more apparent, a semi-conical shaped cutout 30 is provided in each of the wrenching flats 16 which open onto the front end surface 29 of the nut 11 as seen in FIGS. 3 and 4 at the larger end of the cutouts 30. These cutouts 30 are centered on each of the wrenching flats 16 as will become more apparent. Further, one or more seal holes 31 may be provided through the nut 11 between the front end surface 29 and the locking groove 20 to install a seal therein as will become more apparent. In use, it will be seen that the lug nut 11 is tightened onto the lug bolt LB carrying the rim clamp RC thereon so as to lock the tire rim TR onto the hub spider HS as is done in conventional manner. Generally, only one lug nut 11 is used with each hub and the other lug bolts LB have conventional lug nuts LN installed thereon as seen in FIG. 1. When the lug nut 11 is installed, the back end surface 21 is in juxtaposition with the surface of the rim clamp RC so that the back end surface 21 forces the rim clamp into clamping contact with the tire rim TR as seen in FIG. 7.

Figure 5:
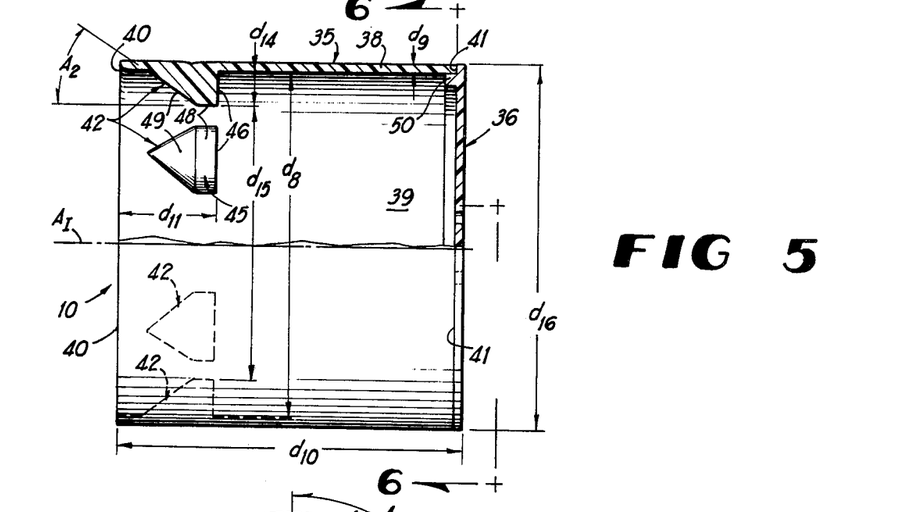
FIG. 5 is an enlarged side elevational view of the indicator assembly of the invention shown partly in cross-section to illustrate the interior construction thereof.
Figure 6:
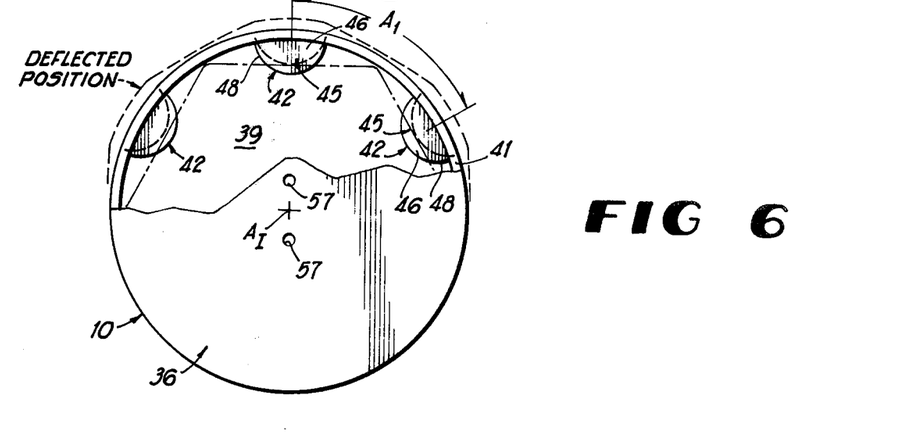
FIG. 6 is a view taken generally along line 6—6 in FIG. 5.

Referring to FIGS. 2, 5 and 6, the indicator assembly 10 includes generally a cylindrical tubular indicator member 35 which is adapted to fit over the lug nut 11 and be locked onto the lug nut 11 by engagement with the locking groove 20. One end of the indicator member 35 is closed by an end cap 36. The cylindrical tubular indicator member 35 is made of a fracturable material with limited resiliency so that the indicator member 35 fractures when this limited resiliency is exceeded. The particular indicator member 35 is illustrated in FIGS. 2, 5 and 6 as made of a plastic material which has this capability as will become more apparent.

The indicator member 35 includes a cylindrical sidewall 38 which defines the nut receiving passage 39 therethrough about the central axis $A_I$ of the indicator assembly 10. The passage 39 has a diameter $d_8$ (FIG. 3) which is slightly greater than the corner diameter $d_2$ (FIG. 4) of the nut 11 so that the nut 11 will just be slidably received in the passage 39 through the cylindrical sidewall 38. The cylindrical sidewall 38 has a wall thickness $d_9$ (FIG. 5) selected so that cylindrical sidewall 38 will fracture before the indicator assembly 10 can be removed as will become more apparent. The cylindrical sidewall 38 has a length $d_{10}$ (FIG. 5) which is greater than the height $d_3$ (FIG. 3) of the nut 11 as will become more apparent and is illustrated at about twice the height $d_3$ of the nut 11. The cylindrical sidewall 38 is illustrated as having a rear end surface 40 and a front end surface 41, both oriented normal to the central axis $A_I$. The end cap 36 closes the passage 39 through the cylindrical sidewall 38 at the front end surface 41 as will become more apparent.

A plurality of locking members 42 is integrally formed on the cylindrical sidewall 38 and projects inwardly into the passage 39 at circumferentially spaced positions about the inside of the cylindrical sidewall 38. The locking members 42 correspond in number to the number of wrenching flats 16 on the lug nut 11. Since there are six wrenching surfaces 16 shown on the lug nut 11, there are six locking members 42 illustrated. The locking members 42 are circumferentially spaced apart by an angular space $A_1$ as seen in FIG. 6 which corresponds to the angular center to center spacing of the wrenching flats 16 on the nut 11. Since there are six surfaces on the nut 11, the angular spacing $A_1$ illustrated is 60°. Each of the locking members 42 has a tapered semi-conical section 44 (FIG. 5) facing the rear end surface 40 of the cylindrical sidewall 38 and a generally semi-cylindrical section 45 (FIGS. 4 and 5) at that end of the locking member 42 facing the front end surface 41 of the cylindrical sidewall. That end of the semi-cylindrical section 45 facing the front end surface 41 of the cylindrical sidewall 38 defines a semi-circular locking surface 46 thereon oriented generally normal to the central axis $A_1$ and located forwardly of the rear end surface 40 of the cylindrical sidewall 38 by the distance $d_{11}$ (FIG. 5). The distance $d_{11}$ corresponds to the distance $d_{12}$ (FIG. 3) between the back end surface 21 of the lug nut 11 and the front side surface 24 of the groove 20 in nut 11 as will become more apparent. The semi-cylindrical section 45 further defines a semi-cylindrical peripheral surface 48 which extends inwardly toward the central axis $A_1$ and rearwardly from the semi-circular locking surface 46. The semi-cylindrical inside surface 48 on section 45 has a maximum height $d_{14}$ (FIG. 5) from the inside of the cylindrical sidewall 38. Thus, the semi-cylindrical inside surfaces 48 on the locking members 42 define a minimum opening distance $d_{15}$ (FIG. 3) between opposed locking members 42 which is less than the distance $d_1$ (FIG. 4) between opposed wrenching flats 16 and about equal to the diameter $d_6$ (FIG. 4) of the bottom surface 22 of the locking groove 20 as will become more apparent. Each of the tapered semi-conical sections 44 of the locking members 42 define a tapered semi-conical deflection surface 49 (FIG. 5) thereon which extends from the semi-cylindrical inside surface 48 to the inside of the cylindrical sidewall 38. The tapered semi-conical deflecting surfaces 49 face the rear end surface 40 on the cylindrical sidewal 38 and angle outwardly from the semi-cylindrical inside surface 48 at the angle $A_2$ (FIG. 5).

It will be seen that the angle of the semi-conical shaped cutouts 30 in the lug nut 11 correspond to the angle $A_2$ so that, when the cylindrical tubular indicator member 35 is positioned on the nut 11 with the axis $A_N$ of the nut 11 coaxial with the indicator axis $A_I$ as seen in FIG. 7, the semi-conical deflecting surfaces 49 on the locking members 42 are in registration with the semi-conical cutouts 30 on the nut 11. This insures rotational registration of the indicator member 35 with the nut 11 to facilitate installation as will become more apparent. It will thus be seen that the deflecting surfaces 49 on locking members 42 deflect the rear end of the cylindrical sidewall 38 ourwardly as the indicator member 35 is driven onto the lug nut 11. The deflected positions of the locking members 42 and the sidewall 38 are shown by dashed lines in FIG. 6.

Figure 8:
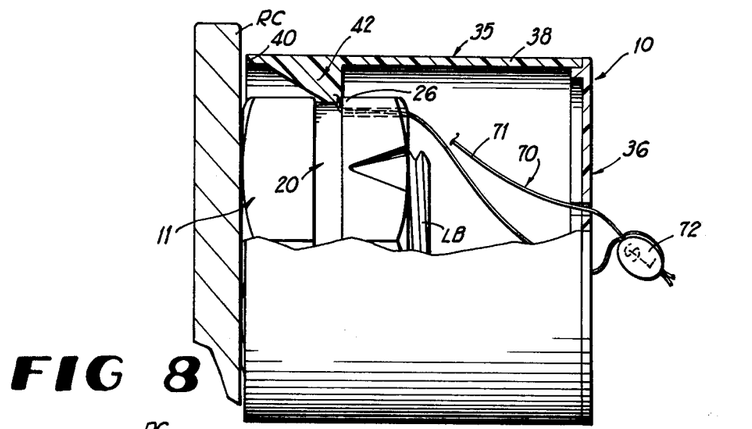
FIG. 8 is a view similar to FIG. 7 showing the invention installed.

When the semi-cylindrical inside surfaces 48 pass over the wrenching surfaces 16 on the nut 11, they drop back into the locking groove 20 behind front shoulder 26 on the nut 11 at about the time the rear end surface 40 onto the cylindrical sidewall 38 engages the rim clamp RC about the back end surface 21 of the nut 11 as seen in FIG. 8. The natural resiliency of the cylindrical sidewall 38 forces the semi-cylindrical sections 45 of the locking members 42 into the locking groove 20 so that the locking surfaces 46 on the locking members 42 now lie behind the front shoulders 26 on the lug nut 11. This prevents the indicator member 35 from being pulled forwardly off the nut 11 while the engagement between the rear end surface 40 of the cylindrical sidewall 38 with the rim clamp RC prevents the indicator member 35 from passing further rearwardly on the nut 11. Because the semi-conical deflecting surfaces 49 are tapered while the locking surfaces 46 are normal to the central axis $A_I$ of the indicator member 35, it will be seen that the locking members 42 can be deflected outwardly while deflecting the cylindrical sidewall 38 sufficiently to allow the locking members 42 to pass over the nut 11 to the locking groove 20, but the locking surfaces 46 on the locking members 42 prevent the indicator member 35 being removed from the lug nut 11 without destroying the indicator member 35. Because the integral joint between the locking members 42 and the sidewall 38 are stronger than the sidewall 38, it will be seen that the sidewall 38 will normally fracture between the locking members 42 as the indicator member 35 is removed from lug nut 11 if it is necessary to remove the lug nut 11 to change the rim and tire assembly TA. Thus, it will be seen that access is permitted to the rim and tire assembly TA for removal if a flat or some other tire damage occurs, yet the indicator member 35 cannot be reused because of its fracture in removing it from the lug nut 11. Thus, the absence of the indicator member 35 from the lug nut 11 indicates readily that the lug nut 11 has been removed to gain access to the rim and tire assembly TA while the presence of the indicator member 35 on the lug nut 11 readily indicates that the rim and tire assembly TA has not been removed.

While the end cap 36 (FIGS. 2, 5 and 6) can be made integral with the cylindrical tubular indicator member 35, it is illustrated as made separately and then permanently attached to the front end of the cylindrical sidewall 38 at the front end surface 41. The end cap 36 illustrated has an outside diameter $d_{16}$ (FIG. 5) corresponding to that of the outside diameter of the cylindrical sidewall 38 and is provided with a rearwardly extending locating lip 50 (FIG. 5) with an outside diameter corresponding to that of the inside diameter of the cylindrical side wall 38 so that lip 50 just fits inside the sidewall 38 while the front end surface 41 on the sidewall 38 abuts the outer peripheral edge of the end cap 36. The end cap 36 may be attached to the cylindrical sidewall 38 in a number of fashions and is illustrated as being attached thereto through an appropriate adhesive. A pair of seal holes 51 may be provided through the end cap 36 to cooperate with the seal holes 31 in the nut 11 to attach the seal between the nut 11 and the indicator assembly 10 as will become more apparent.

The selection of the material of the cylindrical tubular indicator member 35 is critical. The material must have a limited resilience so that the locking members 42 can deflect the cylindrical sidewall 38 sufficiently for the locking members 42 to pass over the wrenching surfaces 16 on the nut 11 as the indicator member 35 is installed. On the other hand, the material of the indicator member 35 must be sufficiently easily fractured to prevent the indicator member 35 from being removed from the lug nut 11 except by fracturing the cylindrical sidewall 38. While a number of different materials may be used, it has been found that a high or medium impact grade plastic such as styrene may be used in the indicator member 35 with satisfactory results. The end cap 36 may be made of the same material or alternatively may be made of a general purpose grade plastic such as styrene since the end cap 36 does not have to be deformed as the indicator member 35 is installed on the lug nut 11. The thickness $d_9$ of the sidewall 38 is selected to insure that sidewall 38 will fracture as the indicator assembly 10 is removed. Thickness $d_9$ is illustrated at about 0.063 inch (1.6 mm) and the plastic hardness is about 70-90 shore D.

Figure 9:
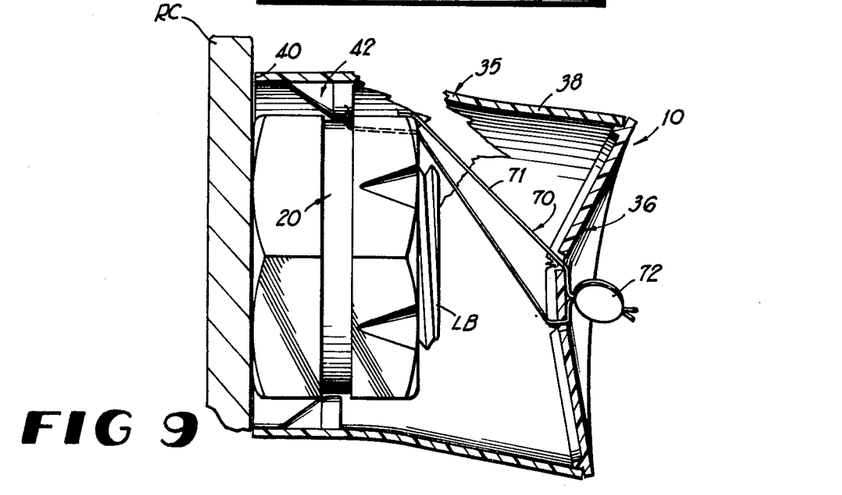
FIG. 9 is a view similar to FIG. 8 showing the invention being fractured to gain access to the lug nut.

FIGS. 7-9 illustrate the indicator assembly 10 being installed on the lug nut 11. FIG. 7 shows the indicator member 35 in position coaxially with the lug nut 11 so that tapered semi-conical deflecting surfaces 49 on the locking members 42 engage the semiconical cutouts 30 in the nut 11. An installation tool 60 is provided which has a cutout 62 therein of a diameter slightly greater than the outside diameter $d_{16}$ of member 35 so that it will just fit over the outside of the end cap 36 and the cylindrical sidewall 38 of the indicator member 35. An annular driving shoulder 61 is provided in the cutout 62 which engages the end cap 36 in alignment with the front end surface 41 on sidewall 38. A recess 64 may be provided in the bottom of cutout 62 to provide clearance if a seal is used. The tool 60 is provided with a driving tang 65 centered on the tool central axis $A_T$ so that, when the tool 60 is coaxial with the indicator assembly 10, the assembly 10 can be installed by striking the tool tang 65 with a hammer. This forces the locking members 42 over the wrenching surfaces 16 into the locking groove 20 as seen in FIG. 8. The indicator assembly 10 is now locked onto nut 11 and must be destroyed as illustrated in FIG. 9 to remove nut 11.

When a seal unit 70 is used, the seal wire 71 is first usually threaded through the seal hole 31 in nut 11 and then through the seal holes 51 in end cap 36 of indicator assembly 10 as seen in FIG. 7. The seal 72 may be applied to the free ends of the seal wire 71 before the installation of the indicator assembly 10 is completed or may be installed afterward as illustrated in FIG. 8. The seal unit 70 provides a further indication whether the rim and tire assembly TA has been removed.

The visibility of the indicator assembly 10 can be enhanced by incorporating a flourescent dye in the material used for the indicator member 35 and/or the end cap 36. The dye color selected could be changed to indicate a particular owner of the trailer frame or trailer.

To enhance the frangibility of the indicator member 35, it may be made out of a plastic material which is sensitive to light to change its crystalline structure so as to become more brittle. Usually, ultraviolet light sensitive plastics would be used. By protecting the light sensitive material until the member 35 is installed, installation would be possible. After exposure to light, however, the crystalline structure would change to prevent the member 35 from being removed from the lug nut 11 without destruction.

Figure 10:
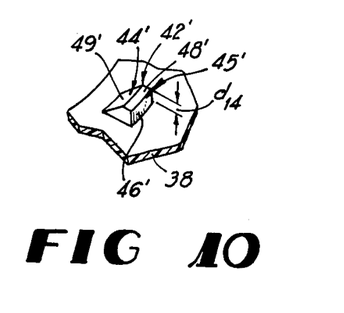
FIG. 10 is an enlarged fragmentary perspective view showing a modification of the invention.

The particular shape of the locking members 42 illustrated in FIGS. 1–9 is not intended in any way to be limiting as to the configuration for use on the indicator member 35. As an example, FIG. 10 illustrates an alternate configuration which has been designated 42'. The cylindrical sidewall 38 is only fragmentally shown; however, it is to be understood that the sidewall 38 would have a configuration similar to the sidewall 38 already described and that the number and location of the locking members 42' would correspond to that of the locking members 42. Each locking member 42' has a tapered deflecting section 44' and a forward section 45' with the forward section 45' defining a locking surface 46' thereon oriented generally normal to the axis of the sidewall 38 and projecting into the passage through the sidewall 38 the distance $d_{14}$ corresponding to that of the locking members 42. The inside surface 48' on the section 45' is arcuate and is complementary in curvature to that of the bottom 22 of the groove 20 in the nut 11 so that the surface 48' can move into the locking groove 20. The tapered section 44' defines a tapered deflection surface 49' thereon which tapers outwardly from the inside surface 48' to the inside of the sidewall 38 and serves a function similar to that of the tapered surface 49 on the locking member 42 to deflect the sidewall 38 so that the locking members 42' can pass over the wrenching surfaces 16 on the nut 11. It will further be appreciated that the cutouts 30 in the nut 11 would usually not be required for the locking members 42' since the locking members 42' would be self centering on the wrenching surfaces 16 as the indicator assembly is installed. The indicator assembly with the locking members 42' is installed in the same manner as the indicator assembly with the locking members 42 already described.

Figure 11:
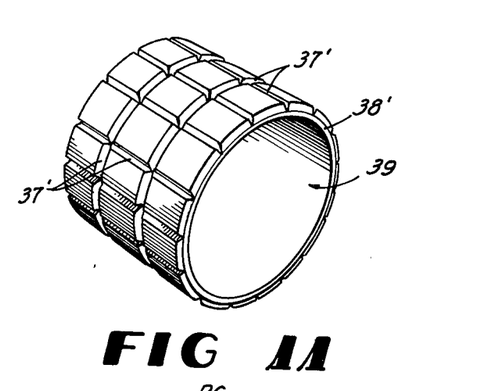
FIG. 11 is a perspective view showing another modification of the invention.
Figures 12, 13, 14, 15, 16:
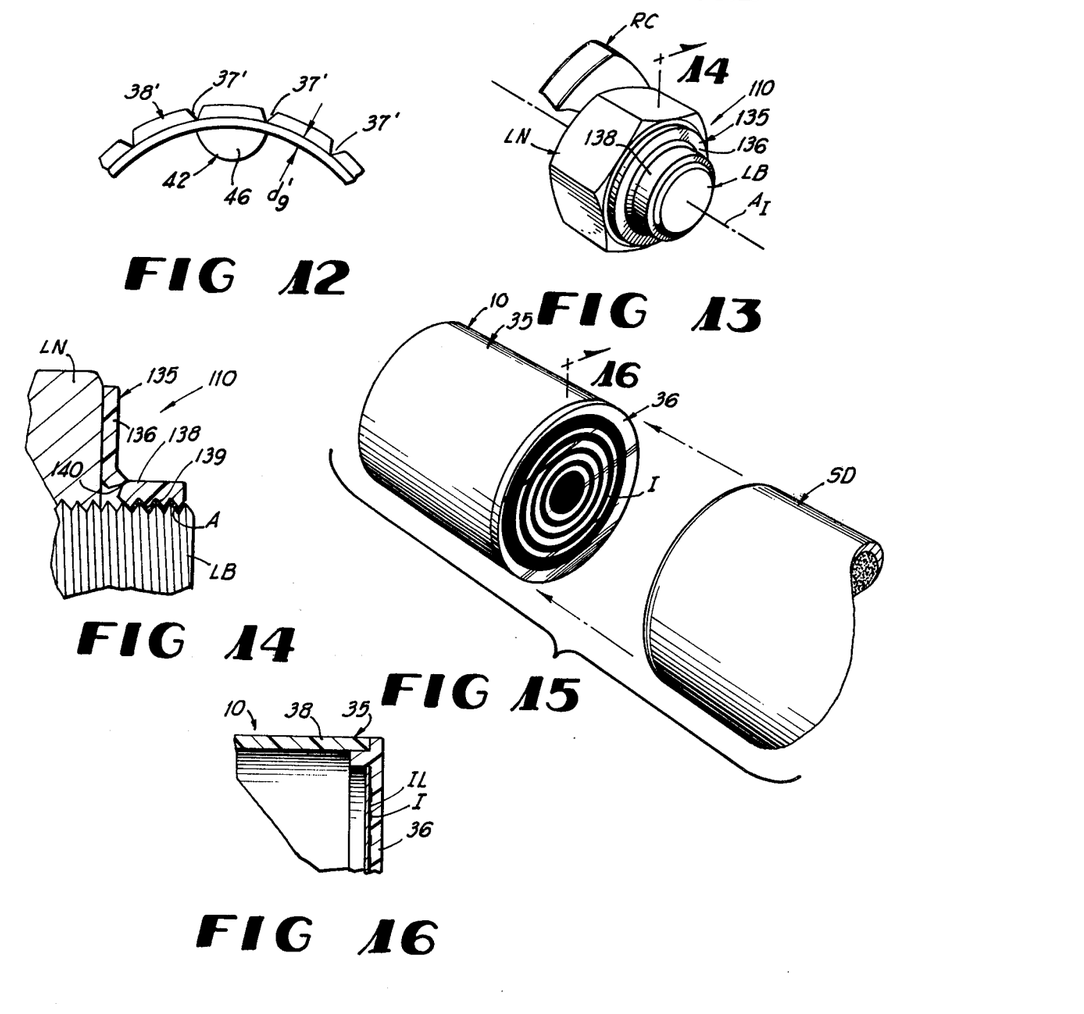
FIG. 12 is an enlarged partial fragmentary transverse cross-sectional view of the modification of FIG. 11.
FIG. 13 is a perspective view illustrating another embodiment of the invention.
FIG. 14 is an enlarged longitudinal cross-sectional view taken along line 14—14 in FIG. 13.
FIG. 15 is a perspective view illustrating another embodiment of the invention.
FIG. 16 is an enlarged fragmentary cross-sectional view taken generally along line 16—16 in FIG. 15.

The sidewall configuration of the indicator member 35 described in FIGS. 1–9 is also not intended to be limiting. As an example, an alternate configuration is illustrated in FIGS. 11 and 12 with the cylindrical sidewall being indicated by the numeral 38'. The internal configuration of the sidewall 38' corresponds to that of the sidewall 38 but its outside configuration is different. The sidewall 38' is provided with a plurality of grooves 37' which are illustrated as extending both circumferentially about the sidewall 38' and longitudinally along the sidewall 38'. The grooves 37' are located so that they pass on opposite sides of the locking members 42 so as to not interfere with the integral connection between locking members 42 and sidewall 38'. The grooves 37' are usually cut to a depth that leaves a sufficient wall thickness $d_9'$ at the thinnest portions of the sidewall 38' so that the sidewall 38' has the same resiliency and frangible characteristics as the sidewall 38. The sidewall 38' may be made of a material such as that suggested for the sidewall 38 but likewise may be made of other materials such as appropriate metals or ceramic materials which give the sidewall 38' the same resiliency and frangible characteristics as the sidewall 38.

The particular configuration illustrated for the indicator assembly 10 is also not meant to be limiting. An example of an alternate indicator assembly is illustrated in FIGS. 13 and 14 and has been designated generally by the numeral 110. The indicator assembly 110 does not fit over the outside of a lug nut, but rather fits onto the end of the lug bolt LB projecting beyond the front of the lug nut. It is likewise to be understood that the special lug nut 11 is not necessarily for use with the indicator assembly 110 and the conventional lug nut LN illustrated may be used. The indicator assembly 110 includes an indicator member 135 with an indicator axis $A_I$ having an outwardly directed indicator flange 136 thereon which is oriented generally normal to the indicator axis $A_I$ and which fits around the lug bolt LB projecting from the lug nut LN. A central boss 138 is integrally connected to the flange 136 and may be internally threaded as indicated at 139 to threadedly engage the lug bolt LB and hold the indicator member 135 in place by threadedly engaging the projecting end of the lug bolt LB. The indicator flange 136 is connected to the boss 138 by a frangible section 140 as will become more apparent. Usually, the indicator member 135 would be applied with an adhesive A coating the threads 139 in the boss 138 so that once the indicator member 135 is screwed onto the projecting end of the lug bolt LB, the adhesive sets up to prevent the indicator member 135 from being unscrewed from the end of the lug bolt LB without the destruction thereof. It will be noted that the conventional lug wrench used to remove the lug nut LN will fit over the indicator member 135 so that the lug nut can be unscrewed from the lug bolt LB with the lug wrench in conventional manner. The unscrewing of the lug nut LN from the lug bolt LB, however, results in not only fracturing the frangible section 140 connecting the boss 138 with the flange 136, but also the destruction of the boss 138 which is adhesively joined to the lug bolt LB. The threads on the lug nut LN will force the indicator member material from the threads on the lug bolt LB as an incidence to the removal of the lug nut therefrom so that the threads on the lug bolt will be cleaned by the unscrewing of the lug nut LN. This process, however, results in the destruction of the indicator member 135 so that it cannot be used after the wheel is replaced. Functionally, then, the indicator assembly 110 performs the same function as the indicator assembly 10 but performs this function in a different manner.

To prevent the indicator assembly 110 from being reproduced by an unauthorized person, the indicator assembly 10 may be further provided with an appropriate indicia as seen in FIGS. 15 and 16 which permits verification that the indicator assembly 10 associated with a rim and tire assembly TA is in fact the indicator assembly 10 which has been installed by the primary shipping company. One means of providing this indication is to use a transparent end cap 36 as best seen in FIG. 2 and then mounting a label IL therebehind which is visible through the end cap 36 as seen in FIGS. 15 and 16. The label IL has indicia I printed thereon in some selected combination that is difficult to reproduce. The indicia I can then be easily scanned by a scanning device SD fragmentally illustrated in FIG. 15 so that the primary shipper simply has a scanning device that is passed by each indicator assembly 10 operatively associated with a rim and tire assembly TA. The scanning device SD then indicates to the primary shipping owner whether it is in fact the indicator assembly 10 installed by him or a counterfeit indicator assembly 10. The indicator label IL, of course, can be attached to the end cap 36 to prevent its removal therefrom without the destruction thereof or molded directly into the end cap. One possible scanning device and appropriate indicia which may be used is that associated with a commercially available laser scanner with an appropriate code preprinted on the label IL. This code consists usually of a series of concentric circles of different widths or of a series of parallel lines of different widths. Alternatively, the scanning device SD could be a particular frequency light source and the indicia I could be a material that was responsive to the particular frequency light source to emit a specified color. It will be appreciated that the code on each indicator assembly 10 may be different to minimize the likelihood of a counterfeit assembly 10 being installed.

Another means of identifying the indicator assembly 10 is to heat emboss a serial number on the indicator member 35 and/or the end cap 36. Inasmuch as the tractor operator would not normally have access to heat embossing equipment, the serial numbers would be difficult to reproduce. The heat embossed serial number is shown by dashed lines in FIG. 2 and identified by reference SN.

Figures 17, 18, 19:
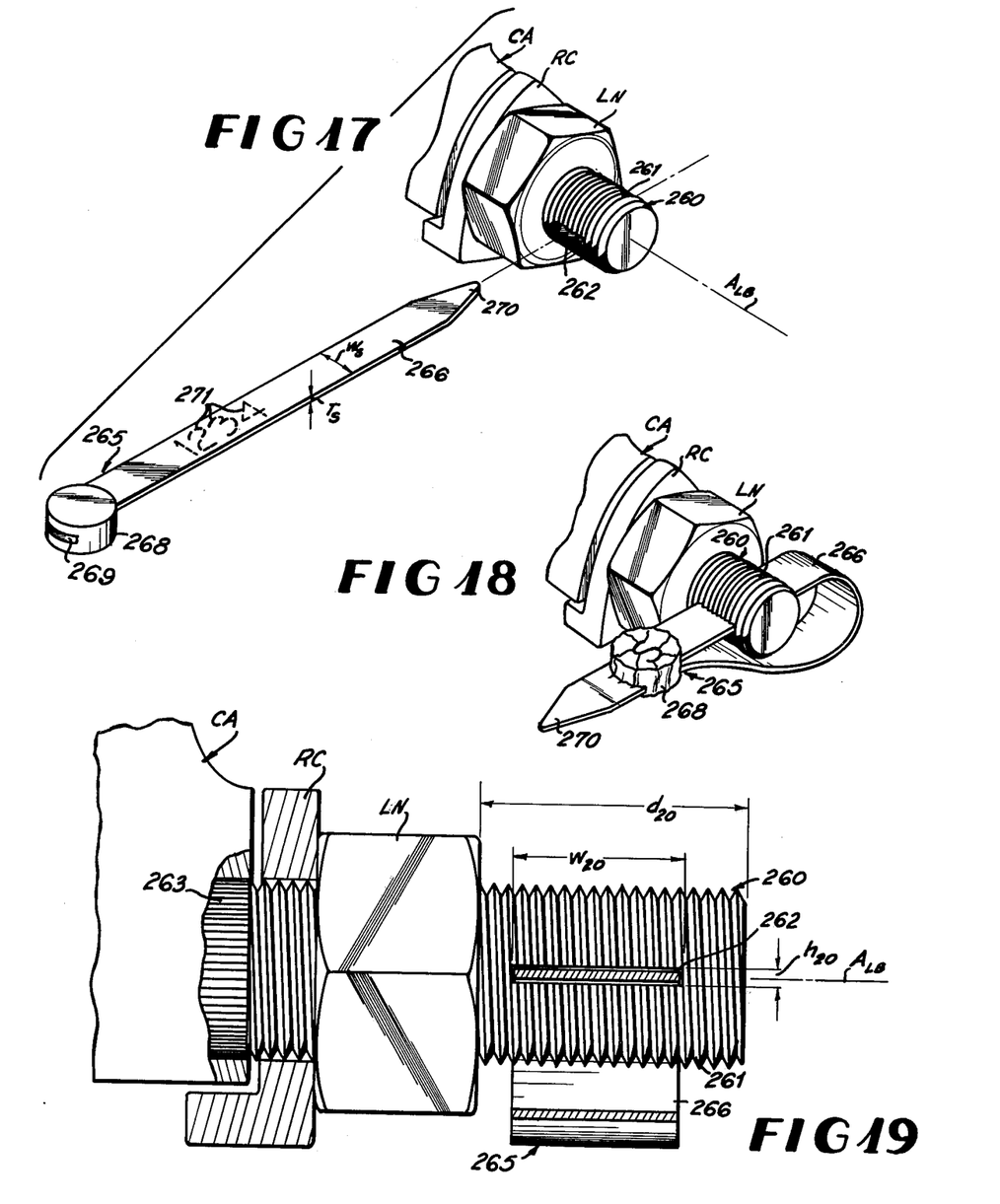
FIG. 17 is an exploded perspective view illustrating another embodiment of the invention.
FIG. 18 is a perspective view similar to FIG. 17 showing the invention installed.
FIG. 19 is an enlarged side view of the invention seen in FIGS. 17 and 18.

FIGS. 17–19 illustrate an alternate embodiment of the indicator assembly and is designated generally by the numeral 210. Like indicator assembly 110, assembly 210 does not fit over the lug nut, but rather, cooperates with the lug bolt. The special lug nut 11 is not necessary for this embodiment of the invention and a conventional lug nut LN illustrated may be used.

The lug bolt used with this embodiment of the invention is usually not standard and has been designated 260 in FIGS. 17–19. Lug bolt 260 is longer than a conventional lug bolt LB so that the threaded end 261 of lug bolt 260 projects out of nut LN a prescribed distance $d_{20}$ seen in FIG. 19 after lug nut LN has been tightened onto lug bolt 260 to lock tire rims in place. While lug bolt 260 may be substituted for one of the conventional lug bolts LB on existing clamping arms of a vehicle hub, one of the lug bolts 260 will most likely be installed when the vehicle hub is being manufactured since the splined base 263 of lug bolt 260 is press fitted as seen in FIG. 19.

The projecting threaded end 261 of bolt 260 is provided with a diametrically extending seal passage 262 therethrough oriented generally normal to the central axis $A_{LB}$ of lug bolt 260. The seal passage 262 may have a variety of cross-sectional shapes and sizes as will become more apparent; however, it is illustrated as rectilinear with width $W_{20}$ parallel to axis $A_{LB}$ and height $H_{20}$ normal to axis $A_{LB}$. The nut LN can be screwed onto bolt 260 over the open ends of seal passage 262 without interference. It will be seen that width $W_{20}$ of seal passage 262 is less than the exposed distance $d_{20}$ of bolt 260 when nut LN is tightened.

An indicator seal 265 is provided which is passed through seal passage 262 to provide an indication that nut LN has not been removed. The indicator seal 265 has a flexible attachment portion 266 and a seal portion 268 which may be integral with each other as illustrated or separate. The attachment portion 266 is inserted through the seal passage 262 and the seal portion 268 is used to attach opposite ends of attachment portion 266 together as seen in FIG. 18 so that the lug nut LN cannot be removed from lug bolt 260 without destroying the indicator seal 265. The attachment portion 266 may have a variety of cross-sectional shapes and sizes; however, it is illustrated as rectilinear with width $W_S$ less than width $W_{20}$ of passage 262 and thickness $T_S$ less than height $H_{20}$ of passage 262 so that attachment portion 266 passes freely through seal passage 262. The particular cross-section shape and size of the attachment portion 266 will determine the cross-sectional shape and size of seal passage 262 in order for the attachment portion to freely pass through the seal passage.

The seal portion 268 is made out of a material which can be permanently attached to the attachment portion 266 either by deforming as illustrated or by some other means. The seal portion 268 illustrated is preattached to one end of the attachment portion 266 and defines an attachment passage 269 therethrough as seen in FIG. 17 so that the free end 270 of attachment portion 266 can freely pass therethrough after insertion through the seal passage in lug bolt 260 as seen in FIG. 18. After the free end 270 of the attachment portion 266 is inserted through the attachment passage 269, the seal portion 268 is crushed with an appropriate crushing tool (not shown) to lock the seal portion 268 onto the free end 270 of attachment portion 266. The finished installation is seen in FIG. 18. If one tries to remove the indicator seal 265 or the lug nut LN, indicator seal 265 will be destroyed beyond re-use. To assist in indentifying the indicator seal 265, appropriate indicia 271 may be provided on the attachment portion 266 as seen in FIG. 17.

When any of the indicator assemblies 10, 110 or 210 are used, it is a simple matter to visually check each set of tire assemblies TA on the equipment to determine whether the indicator assemblies are in place to indicate that the tires have not been removed or substituted. By providing an appropriate coding of the indicator assemblies such as those illustrated, the coding can be incorporated in the equipment interchange agreement and inspection report so that the responsibility for changed or substituted tires can be pinpointed.

What is claimed as invention is:

1. A device for indicating that a rim and tire assembly has been removed from the lug bolts on a vehicular hub by removal of the lug nuts holding the rim and tire assembly on the lug bolts comprising:
   at least one grooved lut nut defining a peripheral locking groove therearound intermediate its ends and lying in a plane generally normal to the central axis of the lug nut adapted to be screwed onto one of the lug bolts to keep the rim and tire assembly on the vehicular hub; and
   frangible indicator means operatively associated with said grooved lug nut after said grooved lug nut has been tightened onto the lug bolt to mount the rim and tire assembly so that removal of said grooved lug nut from the lug bolt for removal of the rim and tire assembly results in the destruction of said frangible indicator means beyond reuse so that the rim and tire assembly can be removed but said frangible indicator means cannot again be operatively associated with the lug bolt and said grooved lug nut after the lug nut is screwed back on the lug bolt to remount a rim and tire assembly on the vehicular hub, said frangible indicator means including a frangible tubular member of limited resilience, and sized to fit over and around the lug nut, said frangible member including a plurality of locks on the inside thereof having a size and shape such that said locks on said tubular frangible member can be forced over said grooved lug nut until said locks engage said peripheral locking groove around the lug nut, the resiliencey of said frangible tubular member being sufficient to force said locks into engagement with said peripheral locking groove around the lug nut so that said tubular member cannot be removed from around the lug nut without fracturing said frangible member so as to prevent reestablishment of said tubular frangible member around the lug nut.

2. The device of claim 1 wherein each of said locks defines a tapered deflecting surface thereon facing the direction in which said frangible member is moved to install said frangible member on the lug nut, and a locking surface thereon facing the direction opposite that in which said frangible member is installed and oriented normal to the central axis of said frangible member, said locking surface engaging the lug nut at said peripheral locking groove to prevent said frangible member from being removed from around the lug nut without fracturing said frangible member.

3. The device of claim 2 further including alignment means for maintaining rotational registration between said frangible member and the lug nut while said frangible member is being installed thereon.

4. The device of claim 1 wherein said frangible indicator means further includes an end cap closing one end of said frangible tubular member.

5. The device of claim 4 further including a seal unit connecting said end cap to the grooved lug nut while said frangible indicator means engages the lug nut.

6. The device of claim 1 wherein said frangible tubular member defines a plurality of grooves therein extending longitudinally of said tubular member and circumferentially about said tubular member.

7. The device of claim 1 further including indicia on said frangible indicator means to identify said indicator means.

8. An indicator assembly indicating the removal of lug nuts from the lug bolts on a vehicular hub mounted rim and tire assembly to provide an indication of whether the rim and tire assembly has been removed where the lug bolts project outwardly from the lug nuts when the lug nuts are tightened into position to mount the rim and tire assembly on the vehicle hub comprising:

an internally threaded frangible boss having a central axis and adapted to be threadedly received on that end of one of the lug bolts projecting from the lug nut after the rim and tire assembly has been mounted;

an annular flange;

a frangible section connecting said annular flange to that end of said boss facing the lug nut and orienting said annular flange normal to the central axis of said boss so that said annular flange is in juxtaposition with the lug nut; and an adhesive joining said boss to the threads on the lug bolt so that the unscrewing the lug nut from the lug bolt fractures said frangible section to separate said annular flange from said boss and fractures said boss so that said indicator assembly is destroyed beyond use as the lug nut is removed.

* * * * *